United States Patent [19]
Eng

[11] 3,866,526
[45] Feb. 18, 1975

[54] BARBECUE PAN STRUCTURE

[76] Inventor: Yat L. Eng, 237 Linden, Elmhurst, Ill. 60126

[22] Filed: Jan. 14, 1974

[21] Appl. No.: 433,088

[52] U.S. Cl.............. 99/357, 99/421 H, 99/446, 99/447, 126/21 R, 126/299 C
[51] Int. Cl. ............................................ A47j 37/04
[58] Field of Search............ 126/21 R, 299 C, 389; 99/444, 445, 446, 447, 421 H, 375, 400, 357

[56] References Cited
UNITED STATES PATENTS

| | | | |
|---|---|---|---|
| 453,418 | 6/1891 | Stroud | 99/445 |
| 1,169,694 | 1/1916 | Swisher | 126/21 R |
| 1,542,867 | 6/1925 | Fisher | 99/425 |
| 1,650,634 | 11/1927 | Lutzler | 99/446 |
| 1,740,205 | 12/1929 | Schmidt | 99/446 |
| 1,969,184 | 8/1934 | Riley | 99/357 |
| 2,262,910 | 11/1941 | Aller | 126/21 R |
| 2,300,837 | 11/1942 | Ames | 99/447 UX |
| 3,088,396 | 5/1963 | Proffitt | 99/446 X |

Primary Examiner—Billy J. Wilhite
Attorney, Agent, or Firm—Hofgren, Wegner, Allen, Stellman & McCord

[57] ABSTRACT

A barbecue pan structure for providing a simulated barbecuing of meat in an oven and preventing smoke from being generated. The structure includes a pan provided with a quantity of water and an overlying cover receiving drippings falling from the meat and conducting them through an opening therein into the pan. The structure further includes a flow passage for conducting steam evolved from the body of water away from the oven chamber in which the barbecuing process is being conducted. A removable receptacle may be provided in the pan for collecting the drippings for subsequent use or disposal and for reducing steaming of meat.

15 Claims, 4 Drawing Figures

PATENTED FEB 18 1975
3,866,526
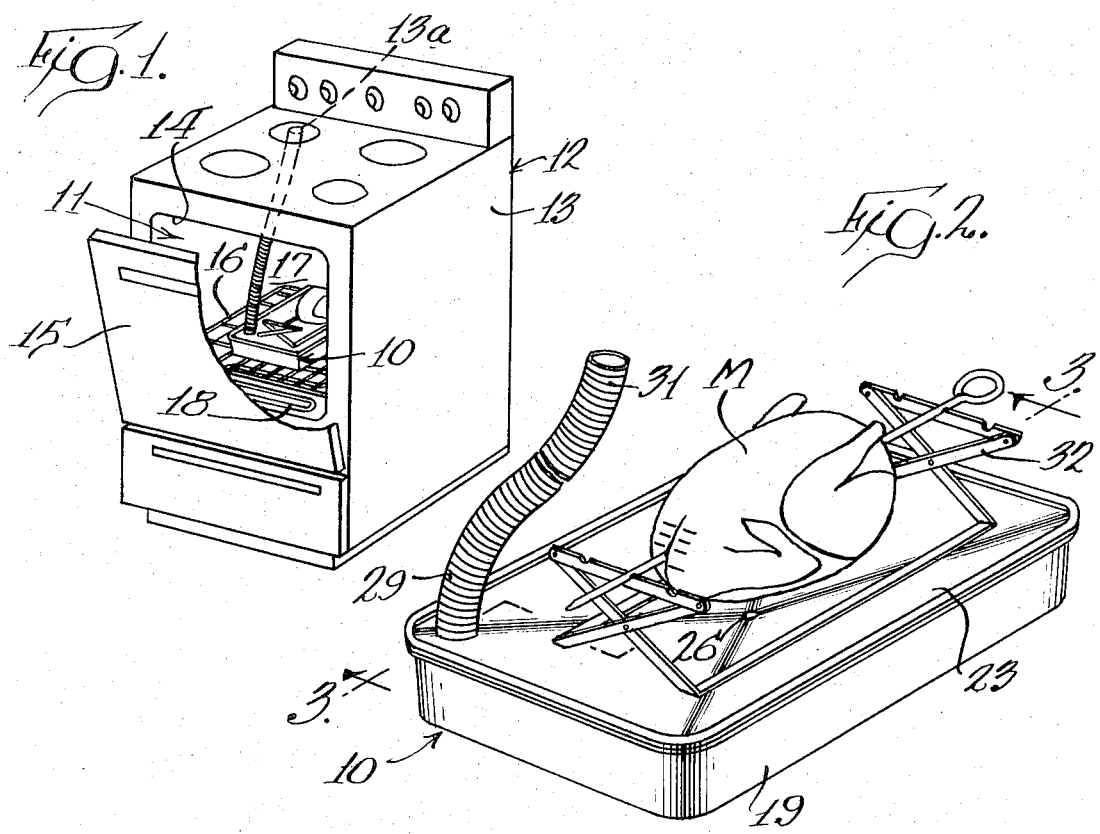
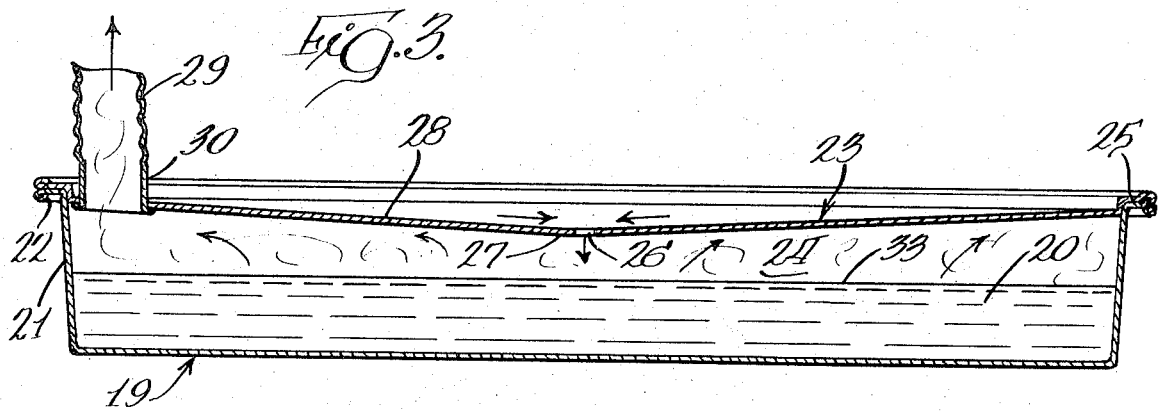
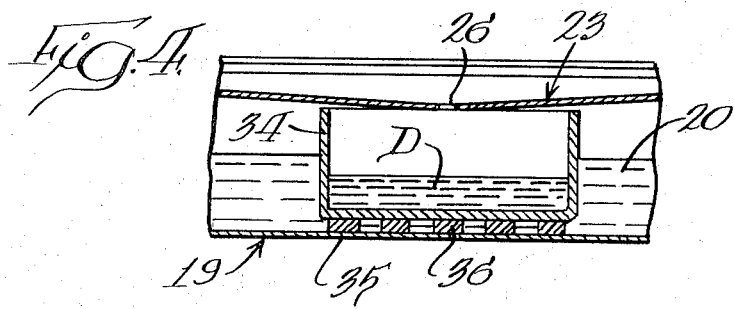

BARBECUE PAN STRUCTURE

BACKGROUND OF THE INVENTION

1. Field of the Invention

This invention relates to cooking utensils, and in particular, to barbecue pan structures.

2. Description of the Prior Art

Conventionally, meat is barbecued in a charcoal device. In order that one may use such a device indoors, good ventilation has to be provided for the smoke from the charcoal. Electric rotisseries are sometimes used to simulate such barbecuing. such rotisseries are expensive and usually relatively small. To avoid the extra expense of special ventilation equipment or the expense of a large electric rotisserie, the range oven is sometimes used to barbecue the meat.

To simulate the barbecuing process in the oven, the meat is often placed on a rack with an empty pan placed subjacent the meat to catch the drippings. This pan normally becomes so hot that the collected oily drippings and barbecue sauce drippings tend to smoke. If ventilation is inadequate, the smoke escaping into the kitchen may become intolerable.

In certain such oven uses, water is placed in the pan subjacent the meat or the meat is placed directly in the pan. Alternatively, the oven temperature may often be maintained relatively low to avoid smoking of the drippings. However, with such attempted solutions to the smoking problem, the meat taste is more like that of a roast than that of a barbecue.

SUMMARY OF THE INVENTION

The present invention is concerned with a new barbecue pan for use in an oven permitting the meat to be cooked in the manner of barbecuing at relatively high temperatures without evolving smoke and the like from the dripping fat.

More specifically, the present invention comprehends providing a barbecue pan structure which is maintained relatively cool to prevent such undesirable smoking notwithstanding the use thereof in a high temperature oven space. The pan structure is effectively cooled by means of water and means are provided for conducting steam evolved from the water during the cooking operation outwardly from the oven space.

The barbecue pan structure defines an upper surface onto which the hot meat drippings fall, and means for conducting the drippings into a lower compartment of the pan. Alternatively, the drippings may be allowed to remain in an upper compartment of the pan structure. However, the meat will be steamed more by evaporation from the watery part of the drippings and the barbecuing effect would not be as good. A receptacle may be provided within the pan to collect the drippings delivered thereinto, allowing the drippings to be saved if desired and further reducing the amount of steam acting on the meat.

Steam evolved from the water during the cooking operation is conducted through a suitable flow passage means from the pan to exteriorly of the oven as through the top ventilation opening of the oven. In the illustrated embodiment, the flow passage means comprises a flexible conduit. The conduit may be removably secured to the barbecue pan structure for facilitated maintenance, and in the illustrated embodiment, is removably secured to the pan cover. The flexibility of the conduit permits the user to position the discharge end suitably to effect the desired discharge of the steam from the oven ventilation opening while yet permitting selective positioning of the barbecue pan structure within the oven as desired.

As the body of water and steam effectively limits the temperature of the barbecue pan structure to approximately that of the boiling point of the water, normally approximately 212° F., contact of the grease drippings with high temperature surfaces is effectively avoided, thereby avoiding smoking of the oily drippings and barbecue sauce drippings and thus preventing smoke from emanating into the kitchen. This technique further allows the barbecue pan to be cleaned more easily than with conventional barbecuing techniques.

Thus, the present invention broadly comprehends the provision of a barbecue pan structure for use in barbecuing meat in an oven chamber including a pan adapted to hold a body of water subjacent the meat in the oven chamber, closure means substantially covering the body of water and defining an upper surface, means for passing through the closure means liquefied drippings falling from the meat onto the upper surface, and flow passage means for conducting steam evolved from the body of water away from the pan to be vented from the oven chamber.

The barbecue pan structure of the present invention when used in a conventional oven is more economical than most electric rotisseries and charcoal barbecuing devices and yet offers the advantages of smokeless indoor barbecuing, automatic temperature control by the oven, permits taking advantage of the relatively large volume of the oven, and permits easy cleaning afterwards. Charcoal flavor may be obtained by using a suitable sauce on the meat.

BRIEF DESCRIPTION OF THE DRAWING

Other features and advantages of the invention will be apparent from the following description taken in connection with the accompanying drawing wherein:

FIG. 1 is a perspective view of a range having an oven in which is disposed a barbecue pan structure embodying the invention;

FIG. 2 is an enlarged perspective view of the barbecue pan structure;

FIG. 3 is a further enlarged longitudinal section taken substantially along the line 3—3 of FIG. 2 with the meat and rack removed; and FIG. 4 is a fragmentary section illustrating a modified form of barbecue pan structure embodying the invention.

DESCRIPTION OF THE PREFERRED EMBODIMENT

In the exemplary embodiment of the invention as disclosed in the drawing, a barbecue pan structure generally designated 10 is shown as being used in an oven portion 11 of a range 12. The oven may comprise a conventional oven defined by suitable insulated cabinet walls 13 defining a top vent 13a and a front opening 14 selectively closed by a door 15. Suitable adjustable racks 16 may be provided in the oven chamber 17 and suitable heating means, such as electric heating element 18 in the bottom of the chamber 17, may be provided for heating the chamber to relatively high cooking temperatures, such as 350°F. or more.

The present invention is directed to the new barbecue pan structure 10 which, as shown in FIGS. 2–4, includes a pan 19 adapted to hold a body of water 20. The side walls 21 of the pan define an outturned rim 22. Closure means in the form of a relatively rigid cover 23 are provided for substantially closing the space 24 within the pan above the body of water 20. As best seen in FIG. 3, cover 23 includes a peripheral portion 25 removably resting on outturned rim 22 of the pan. Cover 23 is upwardly concave and defines an opening 26 in the lowermost mid-portion 27 thereof. Opening 26 comprises means for passing downwardly through the cover 23 liquefied drippings falling from the meat onto the upper surface 28 of the cover and conducted downwardly therealong to the opening 26.

A flow passage means is provided for conducting steam evolved from the body of water 20, and in the illustrated embodiment, comprises a flexible conduit 29 having one end 30 secured to the barbecue pan structure, and, more specifically, to the cover 23. The other end 31 of conduit 29 may be brought outwardly through the vent opening 13a of oven 11 so as to discharge the steam from space 24 to outwardly of the oven chamber 17, as shown in FIG. 1.

In the illustrated embodiment, closure means 23 defines a relatively rigid element capable of supporting the meat M being barbecued and which may be, in turn, supported on a suitable rack 32 carried on the cover, as shown in FIG. 2. If desired, however, the meat may be separately supported and cover 23 may be formed of a lighter material, such as aluminum foil, within the scope of the invention.

The drippings from meat M may be collected on the upper surface 33 of the body of water 20 in the arrangement of FIG. 3. In a modified form of the barbecue pan structure, as shown in FIG. 4, a receptacle 34 may be removably disposed on the bottom wall 35 of pan 19 subjacent the opening 26 in cover 23 for collecting the drippings D. The receptacle may rest on a rack 36 set on pan wall 35 to avoid excessive turbulence in the receptacle. This receptacle further reduces the amount of steam which may come out of space 24 through opening 26 into the oven by extending to closely subjacent the cover 23 as shown in FIG. 4.

As the receptacle is in heat transfer association with the water 20, the collected drippings D are quickly cooled to a relatively low temperature avoiding smoking thereof and maintaining the barbecuing operation clean.

By conducting the steam from space 24 to outwardly of the oven, meat M is prevented from being steamed by the water so as to provide a simulated barbecuing effect rather than a roasting effect in the cooking of the meat. As the steam conducting capacity of conduit 29 is substantially greater than that of the small opening 26, and as the opening 30 is at a higher level than the opening 26, the majority of the evolved steam is dissipated from the oven rather than permitted to contact the meat being cooked to effect the desirable barbecuing operation. Watery juice in the meat passing downwardly with the drippings is similarly conducted primarily from the barbecue pan in the form of steam through conduit 29.

In the illustrated embodiment, the opening 26 is about one-half inch in diameter so as to permit relatively unrestricted flow of the drippings downwardly therethrough while yet effectively minimizing upward flow of steam from space 24 therethrough.

The rack 36 effectively prevents receptacle 34 from being upset or excessively jostled by turbulence resulting from boiling of the water 20.

As the cover surface 28 is maintained at a relatively low temperature at all time, smoking of the oily dripping is avoided and no special ventilation of smoke is required for the indoor barbecuing technique. This further makes it easier to clean the oven chamber 17 and the barbecue pan structure 10.

The foregoing disclosure of specific embodiments is illustrative of the broad inventive concepts comprehended by the invention.

I claim:

1. A barbecue pan structure for use in barbecueing meat in an oven chamber, comprising:
   a pan adapted to hold a body of water subjacent the meat in the oven chamber;
   closure means substantially covering the body of water and defining an upper surface;
   means for passing through said closure means liquefied drippings falling from the meat onto said upper surface; and
   a flow passage duct for conducting steam evolved from said body of water from below said closure means away from said pan to a point exteriorly of said oven chamber thereby to vent such steam from said oven chamber.

2. The barbecue pan structure of claim 1 wherein said flow passage duct comprises a flexible conduit.

3. The barbecue pan structure of claim 1 wherein said flow passage duct has one end secured to said closure means.

4. The barbecue pan structure of claim 1 wherein said flow passage duct is removably retained in said barbecue pan structure.

5. The barbecue pan structure of claim 1 wherein said flow passage duct is removably secured to said closure means.

6. The barbecue pan structure of claim 1 wherein said closure means is upwardly concave and said means for passing the liquefied drippings comprises an opening through said closure means at a lowermost portion thereof.

7. The barbecue pan structure of claim 1 wherein said drippings passing means comprises a hole in said closure means, the steam conducting capacity of said flow passage duct being substantially greater than of said opening.

8. A barbecue pan structure for use in barbecuing meat in an oven chamber, comprising:
   a pan adapted to hold a body of water subjacent the meat in the oven chamber;
   closure means substantially covering the body of water and defining an upper surface;
   means for passing through said closure means liquefied drippings falling from the meat onto said upper surface;
   means in said pan for collecting the passed drippings and preventing contact thereof with the liquid water in the pan; and
   a flow passage duct for conducting steam evolved from said body of water from below said closure means away from said pan to a point exteriorly of said oven chamber thereby to vent such steam from said oven chamber.

9. The barbecue pan structure of claim 8 wherein said collecting means is in contact with said liquid water to be maintained at a temperature approximately that of the boiling temperature of the water.

10. The barbecue pan structure of claim 8 wherein said collecting means comprises a receptacle in said pan subjacent said drippings passing means.

11. The barbecue pan structure of claim 8 wherein said collecting means comprises a receptacle removably carried by said pan subjacent said drippings passing means.

12. The barbecue pan structure of claim 8 wherein said closure means comprises a cover overlying said pan and having a strength preselected to support the meat being barbecued.

13. The barbecue pan structure of claim 8 further including a meat rack, said closure means comprising a cover overlying said pan and having a strength preselected to support the rack and the meat being barbecued.

14. The barbecue pan structure of claim 1 wherein said drippings passing means comprises a first hole in said closure means, the steam conducting flow passage duct defining a second opening in said closure at a higher elevation than that of said first opening.

15. The barbecue pan structure of claim 1 wherein said flow passage duct is removably secured to said closure means at an uppermost portion thereof.

* * * * *